United States Patent

[11] 3,534,768

| [72] | Inventor | Walter W. Powell<br>Houston, Texas |
|---|---|---|
| [21] | Appl. No. | 766,877 |
| [22] | Filed | Oct. 11, 1968 |
| [45] | Patented | Oct. 20, 1970 |
| [73] | Assignee | Anderson, Greenwood & Co.<br>Bellaire, Texas<br>a corporation of Texas. |

[54] CHECK VALVE
4 Claims, 4 Drawing Figs.

[52] U.S. Cl. .................................................. 137/496
[51] Int. Cl. .................................................. F16k 15/14
[50] Field of Search ...................................... 137/496,
510, 491; 251/45, 46, 24, 38, 40

[56] References Cited
UNITED STATES PATENTS

| 901,584 | 10/1908 | Bowman | 251/24 |
| 2,049,521 | 8/1936 | Sloan | 251/40X |
| 2,328,007 | 8/1943 | Griswold I | 137/496 |
| 2,394,911 | 2/1946 | Griswold II | 137/491X |
| 2,417,994 | 3/1947 | Sheets | 251/45X |
| 2,877,791 | 3/1959 | Rich | 251/45X |
| 3,392,750 | 7/1968 | Soberski | 137/496 |

FOREIGN PATENTS

| 30,976 | 1/1904 | Switzerland | 251/24 |

*Primary Examiner*—M. Cary Nelson
*Assistant Examiner*—R. B. Rothman
*Attorneys*—J. Vincent Martin, Joe E. Edwards and Jack R. Springgate ABSTRACT: A check valve having a body defining an inlet, an outlet and a valve seat surrounding communication therebetween, a cap and a diaphragm held tightly between the body and cap and adapted to engage with and disengage from said valve seat to control flow through said check valve.

Patented Oct. 20, 1970 3,534,768
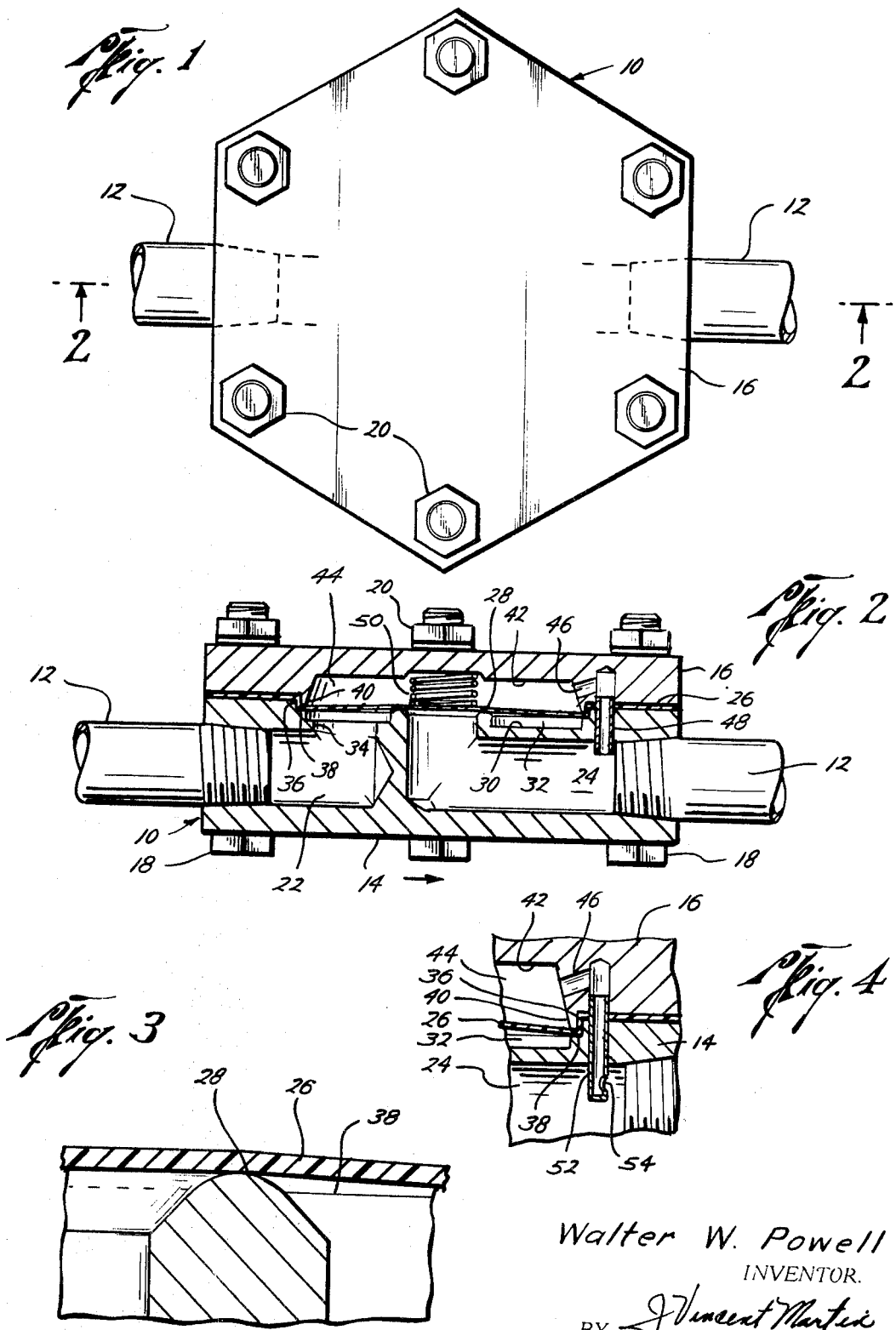
Walter W. Powell
INVENTOR.
BY Vincent Martin
Joe E. Edwards
Jules C. Springate
ATTORNEYS

CHECK VALVE

SUMMARY

The present invention relates to an improved check valve and particularly to an improved diaphragm check valve with improved diaphragm mounting.

An object of the present invention is to provide an improved diaphragm check valve which prevents reverse flows and seals tight under very small pressure differentials.

Another object is to provide an improved diaphragm check valve which provides full flow under conditions of very limited pressure differentials.

A further object is to provide a diaphragm check valve in which the improved diaphragm support maintains the diaphragm taut and wrinkle free.

Still another object is to provide an improved diaphragm check valve which functions properly independent of its orientation in space.

A still further object is to provide an improved diaphragm check valve in which large opening and closing forces are developed with relatively small pressure differentials.

BRIEF DESCRIPTION OF THE DRAWINGS

These and other objects and advantages are hereinafter set forth and explained with reference to the structures shown in the drawings wherein:

FIG. 1 is a plan view of the improved diaphragm valve of the present invention.

FIG. 2 is a detail sectional view of the valve shown in FIG. 1 taken along line 2-2.

FIG. 3 is an enlarged sectional view illustrating the seating position of the diaphragm on one portion of the valve seat.

FIG. 4 is a partial sectional view illustrating a modified form of the improved check valve of the present invention.

DESCRIPTION OF THE PREFERRED EMBODIMENTS

In FIGS. 1 and 2, the check valve 10 of the present invention is shown connected in the fluid flow line 12 to allow flow therethrough in one direction (from left to right in the drawings) and to prevent flow in the opposite direction. The check valve 10 comprises the body 14 and the cap 16 which is secured to the body 14 by the bolts 18 and nuts 20. The body 14 defines the inlet 22 and the outlet 24. Means such as internal threading of the inlet and outlet are provided for the connection of the fluid flow line 12 into the body 14. A resilient diaphragm 26 is positioned between the mating surfaces of the body 14 and the cap 16 as hereinafter described. The body 14 further defines the annular valve seat 28, which surrounds communication between the inlet 22 and the outlet 24. The diaphragm 26 is adapted to engage with the valve seat 28 to close communication between the inlet 22 and the outlet 24. The body 14 also defines the annular recess 30 surrounding the annular valve seat 28 which recess in cooperation with said diaphragm 26 forms the inlet pressure chamber 32. Communication is established between the inlet 22 and the inlet pressure chamber 32 by the passage 34 formed in the body 14. The material of diaphragm may be any suitable resilient material normally used for diaphragms.

The means for mounting the diaphragm includes a female portion defined by the body 14 and the male portion defined by the cap 16. The female portion of such mounting means is provided by the bore 36 which terminates in the shoulder 38. The annular projection 40 on cap 16 which has an outer diameter slightly smaller than the diameter of the bore 36 forms the male portion of the diaphragm mounting means. The male and female portions of the mounting means clamp the diaphragm 26 with the central portion of the diaphragm 26 being taut and wrinkle free and adapted to move to and from engagement with the annular valve seat 28.

The recess 42 in cap 16 and the diaphragm 26 define the outlet pressure chamber 44. The body 14 and the cap 16 define a communication passage 46 communicating between the outlet 24 and the outlet pressure chamber 44. The hollow spring pin 48 extends through the portion of the passage 46 defined by the body 14 and is tightly engaged in a portion of the passage 46 in the cap 16. Thus, the pin 48 functions as an indexing pin to assure that the cap 16 is correctly oriented with respect to the body 14 during assembly.

The operation of the mounting means for the diaphragm 26 is similar to the use of embroidery hoops to stretch the material being embroidered smoothly and evenly between the two hoops. Thus as the annular projection 40 forming the male portion of the mounting means engages the diaphragm 26, it starts to move downwardly into the bore 36 forming the female portion. The diaphragm is held relatively taut and further movement downwardly increases tension in the diaphragm and prevents the formation of wrinkles in the diaphragm 26. The amount of tensioning of the diaphragm during mounting is controlled by the clearance between the bore 36 and the exterior of the projection 40 in relation to the thickness of the diaphragm 26. A reduction in this clearance increases the tension imparted to the diaphragm 26 when mounted. When the cap 16 is securely mounted to the body 14, the projection 40 clamps the diaphragm tightly onto the shoulder 38 in the body 14. Thus, the diaphragm portion within such mounting means is held taut and wrinkle free and is free to move to and from engagement with the valve seat 28 responsive to the pressures on its opposite sides, i.e., the pressures in the inlet and outlet pressure chambers 32 and 44.

To assure that the diaphragm 26 functions properly even when the valve 10 is inverted, the spring 50 is positioned within the chamber 44 and is adapted to be engaged between the cap 16 and the side of the diaphragm 26 opposite the valve seat 28 to lightly urge the diaphragm 26 into engagement with the valve seat 28. The spring 50 assures that the diaphragm engages the valve seat 28 under minimum back pressure differentials regardless of the position in which the check valve 10 is mounted. If the cap 16 is mounted above the body 14 as shown in FIG. 2, so that the gravity tends to urge the diaphragm onto seat 28, a spring 50 need not be used. By being taut in the space between the mounting means, the diaphragm 26 engages the valve seat 28 as shown in FIG. 3. The seating portion of the valve seat 28 is rounded and extends outwardly from the body 14 beyond the shoulder 38. The tensioning in the diaphragm 26 due to its mounting urges the diaphragm 26 into seating engagement with the valve seat 28.

In situations where it is desired to reduce the force resulting from the pressure in the outlet 24 during flow conditions, this force can be reduced by utilizing the modified form of the device illustrated in FIG. 4. In FIG. 4 the structure illustrated is the same as shown in FIGS. 1 and 2 with the exception that a new indexing spring pin 52 is utilized. The spring pin 52, as mentioned with spring pin 48, extends through the portion of the passage 46 defined in the body 14 and is tightly engaged in the aligned portion of the passage 46 in the body 14. The lower end of the spring pin 52 however, is closed and the spring pin 52 defines a port 54 which faces in the downstream direction within the outlet 24. The positioning of the port 54 tends to aspirate fluid from the outlet pressure chamber 44 during conditions of flow to thereby reduce the fluid pressure within the outlet pressure chamber 44 and allow the diaphragm 26 to move farther from engagement with the valve seat 28 thereby allowing greater flows even when the inlet pressure is only slightly above the outlet pressure.

In operation, the check valve 10 remains closed until such time as the fluid pressure in the inlet 22 and within the inlet pressure chamber 32 exerts sufficient force on the diaphragm 26 to overcome the force exerted on the opposite side of the diaphragm 26 by the spring 50 and by the fluid pressure within the outlet fluid pressure chamber 44 to cause the diaphragm to lift from engagement with the valve seat 28. Flow of fluid continues through the valve until such time as the force on the top of diaphragm 26 from the outlet pressure within the outlet pressure chamber 44 and the force of the spring 50 overcomes the force on the underside of diaphragm 26 from the inlet pressure within the inlet pressure chamber 32. Thus, the diaphragm 26 engages the valve seat 28 to shut off flow through the check valve 10 at any time when the outlet pressure approaches the value of the inlet pressure. A valve of this structure has been tested and it was determined that it sealed at a pressure differential less than two-tenths of an inch of water reverse pressure differential and opened at a pressure of two-tenths of an inch of water forward pressure differential. This structure also provides a full flow through the valve even with pressure differentials of less than one inch of water. The utilization of the modified spring pin 52 illustrated in FIG. 4 allows the check valve of the present invention full flow operation on very minor pressure differentials by aspirating the fluid pressure from within the outlet pressure chamber 44.

It has further been discovered that after installing the diaphragm 26 between the body 14 and cap 16, its cracking or opening pressure and its pressure differential for full flow may both be reduced. With the diaphragm 26 held taut and wrinkle free a back pressure is applied to the valve. This back pressure causes the diaphragm 26 to stretch into the body recesses resulting in a small amount of yield in the diaphragm or in its support. This relaxes the tension in the diaphragm 26 while maintaining it wrinkle free. The reduction in tension allows the diaphragm 26 to move off the seat 28 at lower pressure also to provide full flow conditions through the valve at a lower pressure differential.

From the foregoing it can be seen that the improved diaphragm check valve of the present invention provides a novel clamping of the diaphragm so that the diaphragm is maintained in taut and wrinkle free condition. Also, this diaphragm check valve may operate at very substantial pressure, provides full flow through the valve at very minor differentials and seals bubble-tight under very minor reverse pressure differentials. Further, the valve provides a highly flexible seating between the diaphragm and the valve seat so that it may conform to any minor irregularities on the valve seat or to dirt trapped on the surfaces of the seat and still effect a bubble-tight seal even when exposed to very small reverse pressure differentials.

The foregoing disclosure and description of the invention are illustrative and explanatory thereof, and various changes in the size, shape and materials, as well as in the details of the illustrated construction, may be made within the scope of the appended claims without departing from the spirit of the invention.

I claim:

1. A check valve comprising:

a body, said body defining an inlet, an outlet, an annular valve seat surrounding communication between said inlet and said outlet, an annular recess surrounding said valve seat in communication with said inlet, and an annular shoulder surrounding said recess and substantially parallel to said valve seat, and an annular cylindrical bore surrounding said annular shoulder;

a cap, said cap defining a central circular recess and an annular projection surrounding said recess having an outer cylindrical surface;

means for securing said cap to said body;

a resilient diaphragm, said diaphragm being secured between said annular bore and shoulder of said body and annular projection of said cap and adapted to move into and from engagement with said valve seat to control flow through said valve seat between said inlet and said outlet; and means defining a passageway from said outlet to said recess defined by said cap to conduct the pressure of fluid from said outlet to said recess, the diameter of said annular bore of said body and the diameter of said annular projection of said cap being preselected in relation to the thickness of said diaphragm to assure creation of at least a minimum tension in said diaphragm on assembly and the diaphragm is held by clamping engagement between said annular shoulder of said body and the annular projection of said cap, a portion of one side of said diaphragm being exposed to inlet pressure in said annular recess in said body to urge said diaphragm away from said valve seat and the other side of said diaphragm being exposed to outlet pressure in said recess in said cap to urge said diaphragm toward said valve seat whereby said diaphragm permits flow through said valve seat when the inlet pressure exceeds the outlet pressure and shuts off flow through said valve seat when said outlet pressure exceeds said inlet pressure.

2. A check valve according to claim 1, including a spring positioned between said cap and said diaphragm to urge said diaphragm toward said valve seat.

3. A check valve according to claim 1, including aspirating means positioned in said outlet and in communication with said passage so that flow of fluid through said outlet aspirates fluid from said recess in said cap.

4. A check valve according to claim 1 wherein said diaphragm is stretched to relax its tension whereby said diaphragm has a reduced cracking pressure and pressure differential at full flow conditions.